Dec. 25, 1951  L. W. HERCHENROEDER  2,579,574
VAPOR ELECTRIC DEVICE
Filed April 7, 1950
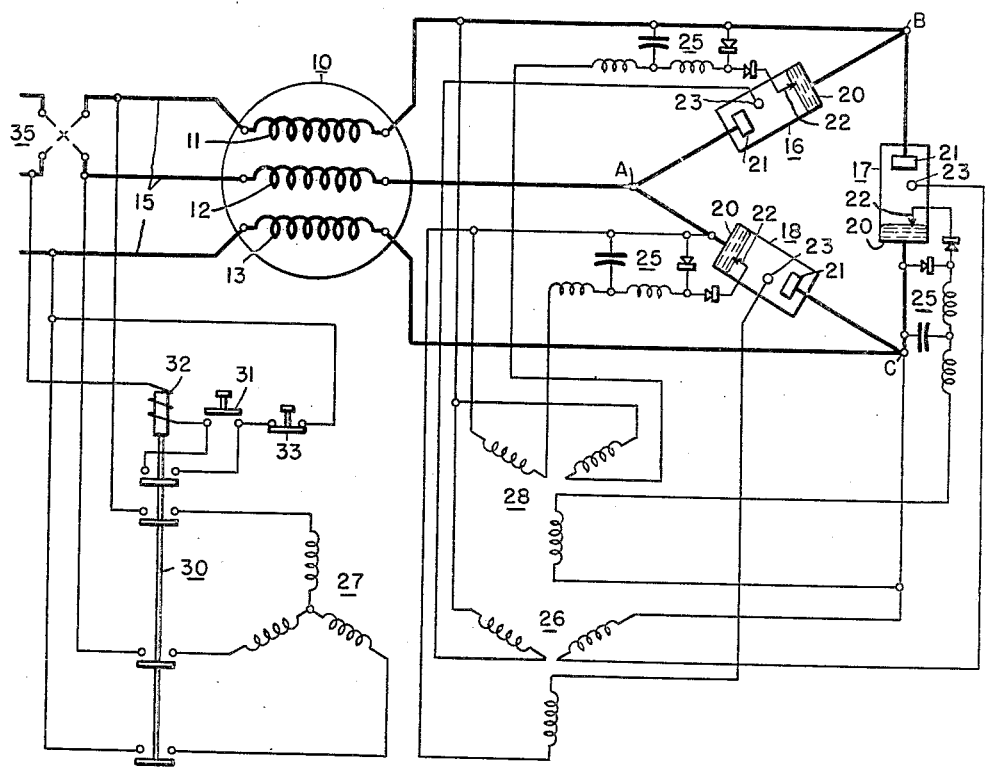
WITNESSES:
INVENTOR
Louis W. Herchenroeder.
BY
ATTORNEY Patented Dec. 25, 1951

2,579,574

UNITED STATES PATENT OFFICE 2,579,574

VAPOR ELECTRIC DEVICE

Louis W. Herchenroeder, Pittsburgh, Pa., assignor to Westinghouse Electric Corporation, East Pittsburgh, Pa., a corporation of Pennsylvania Application April 7, 1950, Serial No. 154,565

3 Claims. (Cl. 315—146)

1

My invention relates to asymmetrically conducting vapor-electric devices or rectifier-valves, and particularly to a group of three or more mesh-connected extinguishable vapor-electric devices utilized as a switching equipment for star-connecting the star-terminals of a star-connected polyphase apparatus.

In the operation of electrical machinery such as heavy duty motors where it is necessary to stop and start the equipment frequently, mechanical contactors have proven inadequate as an excessive amount of operation wears out the parts. It has heretofore been proposed to utilize vapor-electric devices as line switches for such purposes. This has been accomplished by providing back-to-back valves in each of the supply lines to the device. For example, in a three-phase supply circuit, six electric valves would be utilized to open and close the alternating-current circuit.

In the system according to my invention, these six valves are replaced by three valves placed in the neutral connection of the Y connected winding of the machine and operate by controlling the conductivity of the Y connection of the machine. The valves according to my system are connected in series polygon relation, that is, in a mesh or delta connection, so that the energization of the valves permits current to flow from one neutral terminal to the adjacent neutral terminal in the same manner as if the terminals were connected together by a wire.

It is, accordingly, an object of my invention to provide a heavy duty switching device utilizing a minimum of asymmetrically conducting electric valves.

A further object of my invention is to provide a switching system utilizing electric valves to control the neutral connection of a star-connected winding group.

Other objects and advantages of my invention will be apparent from the following detailed description taken in conjunction with the accompanying drawing, in which:

The figure is a schematic illustration of a vapor electric system according to my invention.

In the exemplary embodiment according to my invention, a three-phase induction motor 10 having three Y connected power supply windings 11, 12, 13 is fed from an alternating-current circuit 15 of any desired phase, herein shown as three phase. The neutral terminals A, B and C of the Y connected windings 11, 12, 13 or, in general, any star-connected winding; have the neutral terminals A—B—C connected, by means of

2 the polygon connected valves 16, 17, 18, which when energized, permits current flow in the direction A, B, C, A. Each of the valves 16, 17, 18 is preferably of the vapor electric type and of the kind known as ignitrons having a liquid cathode 20 cooperating with a solid anode 21 and having an ignitor 22 and a keep-alive electrode 23 for initiating conduction in the devices 16, 17, 18.

Each of the ignitors 22 or make-alive electrodes 22, is connected through an impulsating circuit 25 to a supply circuit which may conveniently be the alternating-current supply circuit 15 of the motor 10. Likewise, the keep-alive electrodes 23 are connected to a suitable source 26 of alternating current.

I have shown these connections as being a Y connected transformer 27 having the primary windings 28 connected to the alternating-current supply circuit 15 and having a plurality of substantially independent secondary windings 26 and 28, one of which secondary windings 28 supplies energy to the impulsing circuit 25 and the other 29 of which supplies energy to the keep-alive electrodes 27 in each of the valves 16, 17 and 18.

In order to control the conduction in a neutral terminal of the machine 10, I have provided a control switching device 30 in the primary leads of the control transformer 27. While this switching device 30 may be controlled in any number of ways, in general, I provide a starting switch 31 which energizes a pull-in solenoid 32 which locks itself in while energizing the primary of the transformer 27. A series switch 33 is likewise provided for deenergizing the lock-in solenoid 32 allowing the switching device 30 to drop out and deenergize the control transformer 27, thus causing the extinguishment of the current-conduction of all of the valves 16, 17 and 18.

While these control buttons 31 and 33 may be operated in any number of ways, such as manually or by remote control, they are usually made dependent on a control operation either by time or by position control of the motor 10. For example, the stopping button 33 may easily be the limit switch of a machine (not shown) operated by the motor 10. In order to allow the motor 10 to operate in either direction, a changeover switch 35 is applied ahead of the motor 10 to reverse the connection of two field windings, such as 10 and 11, which, as is well known, reverses the direction of rotation. The supply transformer 27 is connected on the machine side of the reversing switch 35, so that the direction of rotation in the neutral terminal or star point corresponds to the direction of rotation in the energizing windings.

In the operation of the switching system according to my invention, the starting button 31 will be depressed energizing the control transformer 27 which, in turn, supplies an impulse to one of the impulsing circuits 25 which, in turn, initiates current flow in the ignitor 22 and initiates a cathode spot on one of the cathodes 20 of the polygon connected system.

Likewise, the keep-alive electrode 23 will be energized and pick up to maintain the cathode spot in this valve. This keep-alive electrode 23 must be energized over a relatively large portion of the half cycle so that the cathode spot will be available to initiate current flow between the main anode 21 and cathode 20 regardless of the power factor of the equipment. Or in other words, regardless of the lagging of current behind the voltage, the cathode spot must be available when the current flow is to be initiated.

Assuming that point A will be positive at the instant of starting, the valve 16 between A and B will first be energized and depending upon the power factor current will start to flow through the rectifier 16 from the star-terminal A to the star-terminal B of the three-phase device 10. At a later period when terminal B becomes positive with respect to C, the valve 17 between B and C will be energized and current will eventually start to flow from B to C. As the potential varies, current may flow from A to B and back through that phase of the device, or as the potential indicates, it may flow from A to point B and through the valve 17 to point C to return through the opposite Y leg to the alternating-current source 15. Thus, the three rectifiers 16, 17 and 18 are connected in such polarities that they circulate current all in the same direction around the mesh or delta-connection A, B, C.

After a predetermined interval, current will stop flowing in the valve 16 between A and B and the valve 18 between C and A will be energized, so that current will flow from C to A and likewise continuously around the circuit, the valves carrying current substantially 180 electrical degrees. When it is decided to stop the machine, the stop button 33 is depressed deenergizing the excitation and stopping or extinguishing the current flow in the polygon connected valves 16, 17, 18, thus effectively opening the star point of the windings and terminating current flow in the machine.

If desired, the reversing switch 35 may be utilized to reverse the flow of current through the machine windings and consequently the direction of rotation, but this need not be any particular new type of switch, as this device will operate unloaded and will not have the wear and tear of a mechanical switch which must be operated under load current.

The device has a further advantage in that during most of the conducting half cycle, current will be carried through a single one of the valves back to the adjoining phase. Thus I have only a single arc drop in series with the load voltage instead of the double arc drop which must always be in series when the back-to-back valves are utilized as switches.

For purposes of illustration I have shown a preferred embodiment of my invention and described the same according to the best of my present ability. I desire it to be understood, however, that such description and illustration are exemplary only and that changes and modifications may be made therein without departing from the true spirit of my invention or the scope of the appended claims.

I claim as my invention:

1. A control system for a machine having a star connected winding comprising a star connection including a plurality of polygon connected vapor-electric valves, each of said valves including a main anode and cathode, an ignitor electrode and a keep-alive electrode, an impulsing circuit connected to each of said ignitor electrodes, an alternating-current circuit connected to said keep-alive electrode and switching means controlling the energization of said impulsing circuit and said alternating-current circuit.

2. A switching-equipment for star-connecting the terminals of a star-connected polyphase apparatus, comprising a group of mesh-connected extinguishable vapor-electric valves having as many mesh-points as there are star-terminals, for star-connecting said star-terminals, the polarities of said valves being such as to circulate current all in the same direction around said mesh, and control-means associated with said valves for causing the extinguishment of the current-conduction of all of said valves, whereby to deenergize said polyphase apparatus.

3. The invention as defined in claim 2, characterized by said polyphase apparatus being a Y-connected three-phase apparatus, and said valve-mesh being a delta-circuit connection of vapor-electric valves.

LOUIS W. HERCHENROEDER.

REFERENCES CITED

The following references are of record in the file of this patent:

UNITED STATES PATENTS

| Number | Name | Date |
|---|---|---|
| 1,914,350 | Evans | June 13, 1933 |

FOREIGN PATENTS

| Number | Country | Date |
|---|---|---|
| 389,459 | Great Britain | Mar. 6, 1933 |